US005698012A

United States Patent [19]
Yoshikawa

[11] Patent Number: 5,698,012
[45] Date of Patent: Dec. 16, 1997

[54] EXHAUST GAS PURIFYING APPARATUS

[75] Inventor: Hideo Yoshikawa, Yachiyo, Japan

[73] Assignee: Ajiawasu Kabushiki Kaisha, Tokyo, Japan

[21] Appl. No.: 621,348

[22] Filed: Mar. 25, 1996

[30] Foreign Application Priority Data

Mar. 28, 1995 [JP] Japan .................. 7-093205

[51] Int. Cl.$^6$ .................................. B03C 3/78
[52] U.S. Cl. .................. 96/47; 55/242; 60/275; 96/50; 96/57
[58] Field of Search ............ 96/43–50, 55, 96/57; 55/242; 95/75, 281, 67; 60/275, 311, 310, 320

[56] References Cited

U.S. PATENT DOCUMENTS

| | | | |
|---|---|---|---|
| 1,377,363 | 5/1921 | Moon | 96/47 X |
| 3,874,858 | 4/1975 | Klugman et al. | 96/47 |
| 4,222,748 | 9/1980 | Argo et al. | 96/47 X |
| 4,308,038 | 12/1981 | Michel | 96/47 |
| 5,282,885 | 2/1994 | Cameron | 95/67 X |

*Primary Examiner*—Richard L. Chiesa
*Attorney, Agent, or Firm*—Steinberg, Raskin & Davidson, P.C.

[57] ABSTRACT

An exhaust gas purifying apparatus capable of exhibiting an excellent exhaust gas purifying capability and restoring the capability to an initial level even after running for a long period of time. An electrification mesh section electrostatically negatively charges useless particulates contained in exhaust gas and a purification filter section adsorbs thereon the particulates thus charged, resulting in the particulates being separated from the exhaust gas. Also, when the purification filter is made of carbon fiber or carbon particles or the denitration filter section is additionally provided, a reduction in concentration of nitrogen oxides in the exhaust gas is accomplished as well. In a reactivation unit, cleaning liquid cleans the purification filter section to remove useless particulates therefrom, so that an exhaust gas purification capacity of the exhaust gas purifying apparatus may be restored to a level substantially equal to an initial level thereof.

10 Claims, 6 Drawing Sheets

REGENERATION BY CLEANING LIQUID

FIG. 11

REGENERATION BY AIR PRESSURE
(6.5 kg/cm$^2$)

EXHAUST GAS PURIFYING APPARATUS

BACKGROUND OF THE INVENTION

This invention relates to an exhaust gas purifying apparatus, and more particularly to an exhaust gas purifying apparatus for removing fine particles or particulates such as soot and the like contained in exhaust gas produced from various kinds of combustion engines such as, for example, a construction machine, an internal combustion power generating apparatus and the like to purify the exhaust gas.

The present invention is efffectively applicable to an automobile, a ship, a gas turbine, a boiler, an incinerator, a reaction furnace, a water boiler and the like.

Air pollution due to exhaust gas discharged from various combustion engines such as an automobile and the like has been in serious question as compared with before. Air pollutants contained in the exhaust gas typically include particulates or fine particles such as soot and the like.

Removal of such particulates from exhaust gas has been generally carried out using techniques of electrostatically charging particulates by corona discharge under a voltage as high as 6 to 10 kV and then collecting or capturing the thus-charged particulates at positive and negative electrodes to which a voltage as high as 3.3 to 10 kV is applied, techniques of collecting or capturing particulates by means of ceramic filters (see FIG. 1), or the like.

The techniques using corona discharge require additional units or equipments, to thereby large-size a whole fine particle purifying system. Thus, the techniques fail to be applied to a small-sized combustion engine such as an automobile or the like. Also, the techniques require to remove collected or captured particulates at an interval of 1 to 3 hours and disassemble the system for every reactivation of the system. Thus, the techniques are of no practical use. Further, the techniques need subsidiary parts, resulting in being costly.

Techniques using a ceramic filter are adapted to burn collected or captured particulates using gas of an elevated temperature to convert them into carbon dioxide, to thereby exhibit an advantage of facilitating restoration of a fine particle capturing capacity of a fine particle purifying apparatus. However, this requires a large amount of air at a temperature as high as 750° to 950° C. Also, use of high temperature gas described above requires fuel, a combustion chamber, an ignition plug, an air intake means and the like, leading to large-sizing of the apparatus and an increase in cost. Further, a thermal cycle causes the ceramic filter to be deteriorated, leading to damage thereto.

Recently, nitrogen oxides ($NO_x$) contained in exhaust gas have been in question as air pollutants.

Thus, it would be desirable to provide an apparatus capable of not only accomplishing purification of exhaust gas and being reactivated but decreasing the amount of nitrogen oxides discharged to air.

SUMMARY OF THE INVENTION

Accordingly, it is an object of the present invention to provide an exhaust gas purifying apparatus which is capable of removing useless particulates contained in exhaust gas from the exhaust gas to purify it.

It is another object of the present invention to provide an exhaust gas purifying apparatus which is capable of accomplishing a decrease in content of nitrogen oxides in exhaust gas as well as removal of particulates from the exhaust gas, to thereby purify the exhaust gas.

It is a further object of the present invention to provide an exhaust gas purifying apparatus which is capable of restoring an exhaust gas purifying capability substantially to an initial level.

In accordance with one aspect of the present invention, an exhaust gas purifying apparatus is provided. The exhaust gas purifying apparatus includes a fine particle adsorbing unit for removing, by adsorption, useless particulates contained in exhaust gas produced by combustion of fuel in a combustion chamber of an internal combustion engine from the exhaust gas to purify the exhaust gas and a reactivation unit for removing the adsorbed useless particulates from the fine particle adsorbing unit by cleaning, to thereby restore an exhaust gas purifying capability of the fine particle adsorbing unit. The fine particle adsorbing unit includes at least one combination of an electrification mesh section and a purification filter section. The electrification mesh section is arranged in an exhaust gas discharge path extending from the combustion engine and includes a conductive porous material and a stainless steel net connected to a negative electrode of a DC power supply. The purification filter section is arranged on a downstream side in the exhaust gas discharge path based on the electrification mesh section and includes a conductive material layer connected to a positive electrode of the DC power supply. The activation unit includes a cleaning liquid nozzle arranged so as to be projected into a space defined in the exhaust gas discharge path in which the fine particle adsorbing unit is arranged, a drain means arranged at a lower portion of the exhaust gas discharge path, and a cleaning liquid tank detachably arranged separately from the exhaust gas discharge path. The exhaust gas purifying apparatus further includes a cleaning liquid feed pipe for connecting the cleaning liquid nozzle and cleaning liquid tank to each other therethrough and a cleaning liquid recovery pipe for connecting the drain means and cleaning liquid tank to each other therethrough.

In a preferred embodiment of the present invention, the DC power supply generates a voltage of 12 to 500 volts.

In a preferred embodiment of the present invention, the conductive porous material for the electrification mesh section is constructed of a substrate and a conductive substance carried on said substrate. The substrate is selected from the group consisting of a carbon fiber felt, a carbon fiber cloth, a stainless steel wire net, a stainless steel wire felt, a fabric of synthetic fiber and a non-woven fabric of synthetic fiber. The conductive substance is a metal powder and deposited on the substrate by plating.

In a preferred embodiment of the present invention, the conductive porous material for the electrification mesh section has a mesh size of 20 to 500.

In a preferred embodiment of the present invention, the conductive substance for the electrification mesh section is selected from the group consisting of platinum and palladium and deposited on said substrate by plating.

In a preferred embodiment of the present invention, the conductive material layer for the purification filter section is at least one selected from the group consisting of a carbon fiber felt, a carbon fiber cloth, a stainless steel wire net, a stainless steel wire felt, a woven fabric of synthetic fiber and a non-woven fabric of synthetic fiber which have a metal powder deposited thereon by plating, and a laminate plate of porous epoxy resin cured and carbonized and a fiber product thereof.

In a preferred embodiment of the present invention, the conductive material layer for the purification filter section has one of platinum and palladium deposited thereon by plating.

In a preferred embodiment of the present invention, the carbon fiber has an average surface area of 0.5 to 2000 m²/g.

In a preferred embodiment of the present invention, the cleaning liquid is a petroleum solvent such as petroleum with a fragment additive.

In a preferred embodiment of the present invention, the apparatus further includes a water vapor condensing means. The water vapor condensing means includes an exhaust gas withdrawing pipe equipped with fins and arranged at a portion of the exhaust gas discharge path between the heat engine and the fine particle adsorbing unit and a water reservoir connected to the exhaust gas withdrawing pipe.

In a preferred embodiment of the present invention, the apparatus further includes a denitration filter section including a layer containing one of carbon fiber and carbon particles and arranged at any desired portion of the exhaust gas discharge path.

In accordance with another aspect of the present invention, a reactivation unit attached to an exhaust gas purifying apparatus to restore an exhaust gas purifying capability of the exhaust gas purifying apparatus is provided. The reactivation unit includes a cleaning liquid nozzle arranged so as to be projected into a space defined in an exhaust gas purifying chamber in which a material to be cleaned is placed, a drain means arranged at a lower portion of the exhaust gas purifying chamber, a cleaning liquid tank detachably arranged separately from the exhaust gas purifying chamber, a pump, and a cleaning liquid feed pipe. The cleaning liquid nozzle and cleaning liquid tank are connected through the pump by means of the cleaning liquid feed pipe. The unit further includes a cleaning liquid recovery pipe. The drain means and cleaning liquid tank are connected to each other through the cleaning liquid recovery pipe.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, an exhaust gas purifying apparatus according to the present invention will be described hereinafter with reference to the accompanying drawings.

Referring to FIGS. 2 to 11, an embodiment of an exhaust gas purifying apparatus according to the present invention is illustrated.

An exhaust gas purifying apparatus of the illustrated embodiment generally includes a fine particle adsorbing unit for removing, by adsorption, useless fine particles or particulates from exhaust gas produced by combustion of fuel in a combustion chamber of an internal combustion engine to purify the exhaust gas and a reactivation unit for removing, from the fine particle adsorbing unit, the useless particulates adsorbed thereon by means of cleaning liquid, to thereby restore a fine particle purifying capability or a fine particle adsorbability of the fine particle adsorbing unit. The exhaust gas purifying apparatus may be additionally provided with a denitration filter section, resulting in exhibiting a denitration function or decreasing a concentration of nitrogen oxides in the exhaust gas as well. Alternatively, in the exhaust gas purifying apparatus, a purification filter section which will be detailedly described hereinafter may be constructed so as to exhibit such a denitration effect as well as its inherent function. The term "useless particulates" or "useless fine particles" used herein indicates particulates such as soot, ash and the like which are produced by combustion of fuel.

First, the fine particle adsorbing unit will be described hereinafter. The fine particle adsorbing unit includes an electrifying mesh section 14 and a purification filter section 16, which are arranged in an exhaust gas pipe 12 constituting at least a part of an exhaust gas discharge path extending from a combustion engine in a manner to be in proximity to the combustion engine and apart therefrom, respectively. The exhaust gas pipe 2 is an example of the exhaust gas discharge path and connected to a combustion chamber of the combustion engine. Thus, a chamber means of desired configuration and volume such as a closed vessel of the expansion chamber type in which a closed space is defined may be substituted for the exhaust gas pipe 12. Then, the chamber means is connected to the combustion chamber of the combustion engine.

Figure 2:
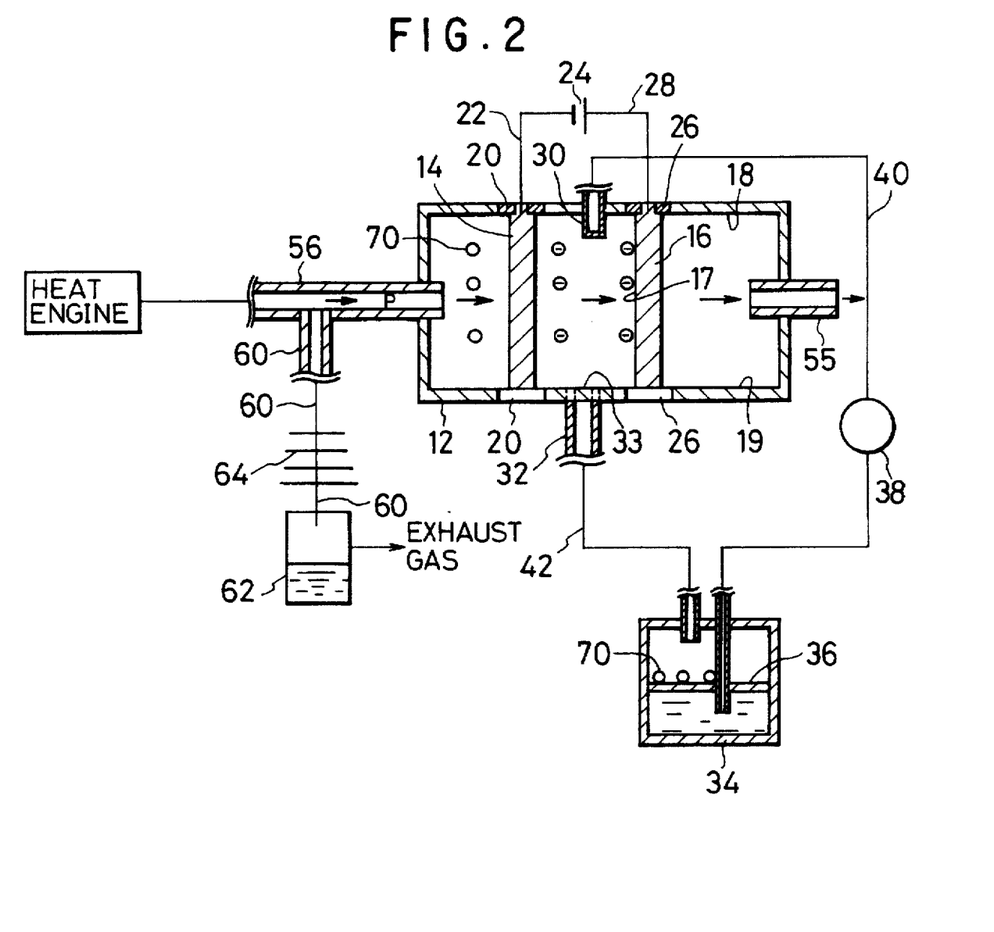
FIG. 2 is a longitudinal sectional view showing an embodiment of an exhaust gas purifying apparatus according to the present invention.

The electrification mesh section 14 is mounted through an insulating support 20 in the exhaust gas pipe 12 so as to extend between an inner upper surface 18 of the exhaust gas pipe 12 and an inner lower surface 19 thereof in a direction perpendicular to a longitudinal or axial direction of the exhaust gas pipe 12 or a direction of flow of exhaust gas indicated at arrows in FIG. 2. The electrification mesh section 14 is electrically connected through a conductor 22 to a negative electrode of a DC power supply 24, which preferably generates a voltage between about 12V and about 500V.

The electrification mesh section 14 is made of any suitable conductive porous material exhibiting air permeability. The conductive porous material may be formed of a substrate and a conductive substance carried on the substrate. The substrate may be selected from the group consisting of a carbon fiber felt, a carbon fiber cloth, a stainless steel wire net, a stainless steel wire felt, a fabric of synthetic fiber such as nylon, a non-woven fabric thereof, and the like. The conductive substance may be a powder of metal such as copper, titanium, nickel, iron or the like. The conductive substance may be carried on the substrate by electroless plating, electroplating, adhesion, application or the like. Alternatively, platinum or palladium may be plated into a thickness of about 0.3 to 1.0 μm for this purpose. This is preferable also from a viewpoint that platinum or palladium acts to convert unburnt hydrocarbons contained in exhaust gas into water and carbon dioxide to reduce a content of hydrocarbon therein.

The conductive porous material preferably has a mesh size between 20 and 500. However, the conductive porous material made of a non-woven fabric is not subject to such restriction. Two or more such substrates may be combined with each other. For example, a plurality of metal wire nets or stainless steel wire nets of 40 meshes may be laminated on each other. Alternatively, metal wire nets of 30 and 60 meshes may be laminated on each other. Also, a plurality of metal wire nets of 60 meshes may be laminated together for this purpose.

The carbon fiber felt or cloth may be made of conventional carbon fiber. Alternatively, it may be made of carbon fiber of an increased surface area (about 0.5 to 2000 $m^2/g$ and preferably about 200 to 2000 $m^2/g$) formed into a denatured structure (porous structure) by activation. Such carbon fiber thus formed into a denatured structure by activation may be made by contacting conventional carbon fiber with water vapor of a temperature as high as about 1000° C. for about 1 to 2 hours or nitrogen monoxide gas of about 100° to 500° C. for about 7 to 12 hours. Alternatively, the denatured structure may be formed by contacting conventional carbon fiber with a nitric acid solution of up to 63.1% in concentration at a temperature between a room temperature and 75° C. for about 5 minutes to 2 hours.

Figure 5:
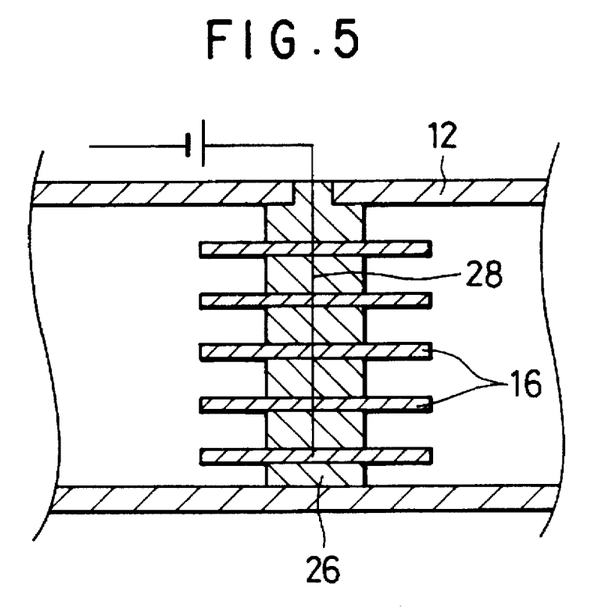
FIG. 5 is a longitudinal sectional view showing a purification filter section for a fine particle adsorbing unit.

The purification filter section 16 is arranged on a downstream side in the direction of flow of the exhaust gas in the exhaust gas discharge path on the basis of the electrification mesh section 14 and mounted through an insulating support 26 in the exhaust gas pipe 12 so as to extend between the inner upper surface 18 of the exhaust gas pipe 12 and the inner lower surface 19 thereof in the direction perpendicular to the longitudinal direction of the exhaust gas pipe 12 as shown in FIG. 2 or in parallel to the exhaust gas pipe 12 as shown in FIG. 5. The purification filter section 16 is electrically connected through a conductor 28 to a positive electrode of the DC power supply 24. The purification filter section 16 may be made of a conductive material substantially identical with that for the electrification mesh section 14 described above. Alternatively, the conductive material may be a laminate plate made of porous epoxy resin cured and carbonized and formed into a thickness of 0.1 to 2 mm Also, the conductive material may be a fiber product of the porous epoxy resin thus treated.

Figure 3:
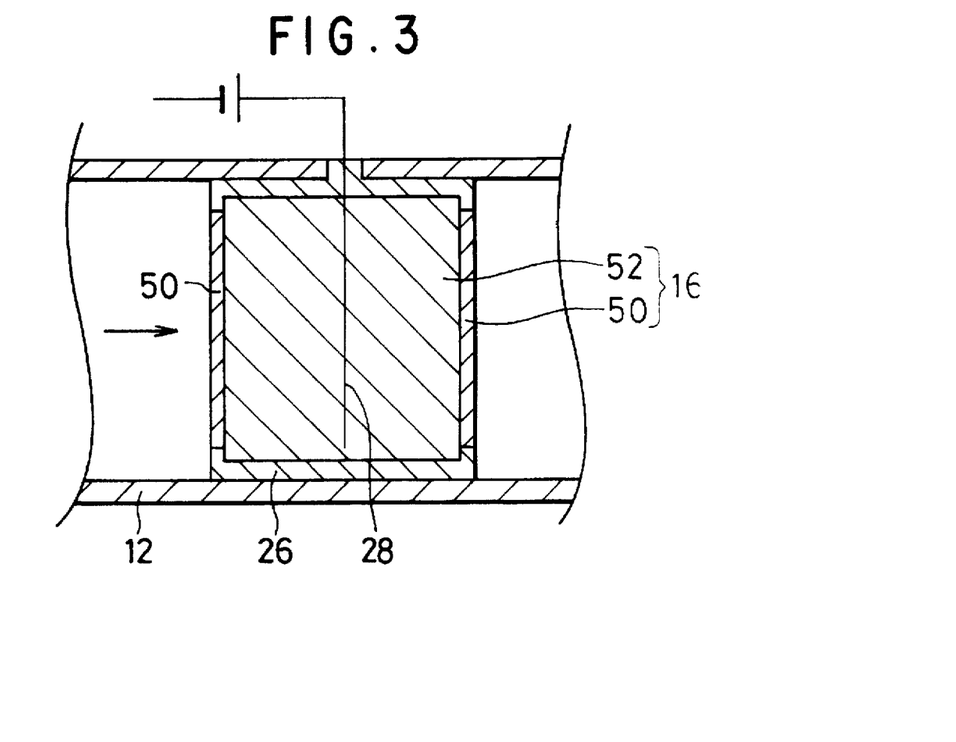
FIG. 3 is a longitudinal sectional view showing a purification filter section for a fine particle adsorbing unit.
Figure 4:
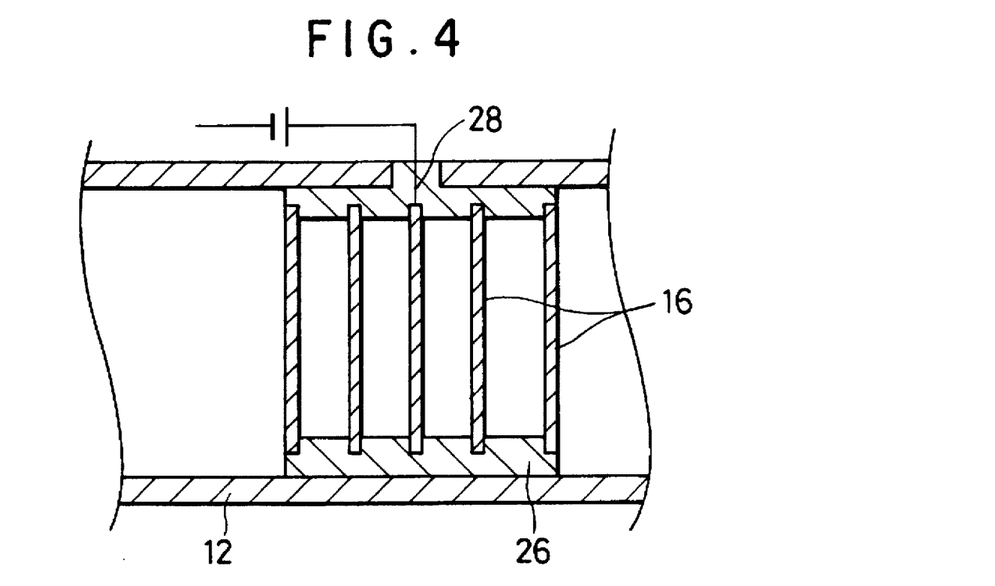
FIG. 4 is a longitudinal sectional view showing a purification filter section for a fine particle adsorbing unit.
Figure 6:
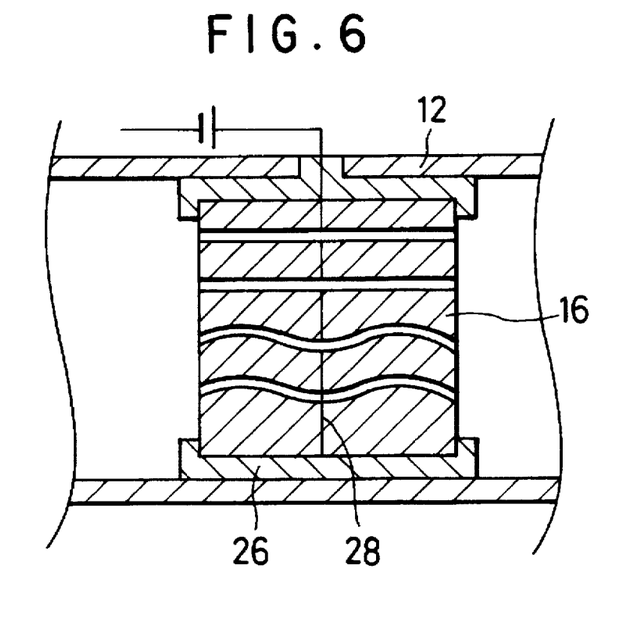
FIG. 6 is a longitudinal sectional view showing a purification filter section for a fine particle adsorbing unit.

The purification filter section 16 may be constructed in any suitable manner. For example, it may be formed of a combination of a wire net of 80 meshes made of a steel wire for 60 meshes and arranged on an upstream side in the direction of flow of exhaust gas in the exhaust gas pipe 12 and a folded wire net of 30×170 meshes arranged on a downstream side therein. Alternatively, as shown in FIG. 3, it may be constructed by interposedly arranging a carbon fiber felt 52 between woven fabrics or non-woven fabrics 50 of synthetic fiber having a copper powder deposited thereon by electroless plating or electroplating. In this instance, the woven fabric or non-woven fabric 50 may be replaced with a stainless steel wire net and the carbon fiber felt 52 may be replaced with a stainless steel wire net or a stainless steel wire felt. Also, as shown in FIG. 4, it may be so constructed that a plurality of the above-described conductive materials are arranged in a manner to be spaced from each other at intervals of 2 to 5 mm laterally or in the longitudinal or axial direction of the pipe 12. Further, as shown in FIG. 5, it may be so constructed that a plurality of the above-described conductive materials are arranged in a manner to be spaced from each other at intervals of 2 to 5 mm vertically or in a direction perpendicular to the longitudinal direction of the pipe 12. Moreover, as shown in FIG. 6, it may be constructed so that the carbon fiber felt or stainless steel wire felt is formed with a plurality of through-holes of any desired configuration so as to extend in the direction of flow of exhaust gas. Formation of the through-holes is for the purpose of reducing pressure loss. The through-holes are preferably formed into a corrugated shape in longitudinal section, resulting in increasing a contact area between the filter section 16 and exhaust gas to be treated. Formation of a layer of carbon fiber or carbon particles into the purification filter section 16 as shown in FIGS. 3 to 6 permits the filter section to exhibit a muffling function.

Materials for both electrification mesh section 14 and purification filter section 16 are preferably selected and combined together in view of a mesh size of both materials, a fine particulate adsorbability thereof and the like. For example, when a stainless steel wire net of 0.3 to 1.0 μm in thickness having platinum or palladium deposited thereon by plating is used for the electrification mesh section 14, the purification filter section 16 may be made of a laminate plate of porous epoxy resin cured and carbonized or a carbon fiber product thereof which is formed into a reduced thickness sufficient to permit it to be air-permeable and coated with a metal wire net having platinum or palladium deposited thereon by plating.

Also, the illustrated embodiment may employ a plurality of combinations between the electrification mesh section and the purification filter section. In this instance, construction of the electrification mesh section 14 and/or purification filter section 16 may be varied for every combination. For example, when the electrification mesh section 14 of the combination located at a first position or an uppermost-stream side in a direction of flow of exhaust gas has a plurality of laminated metal or stainless steel wire nets of 40 meshes incorporated therein, the electrification mesh section 14 of the combination located at each of the subsequent positions may have a plurality of laminated metal wire nets of 60 meshes or a folded metal wire net of 32×170 meshes incorporated therein. Also, when a carbon fiber layer or a carbon particle layer is used for the purification filter section 16 of the combination located at the first position, the purification filter section 16 located at each of the subsequent positions may be formed of such a carbon fiber felt, mat, cloth or sheet as shown in each of FIGS. 3 to 6.

Now, the reactivation unit will be described hereinafter. Generally speaking, the whole reactivation unit forms a closed circuit. More particularly, it, as shown in FIG. 2, includes a cleaning liquid nozzle 30 arranged on an upper surface of the exhaust gas discharge path or exhaust gas pipe 12 in a manner to be projected into a space defined in the exhaust gas pipe 12. The cleaning liquid nozzle 30 is formed with a small through-hole for ejecting cleaning liquid in a specified or varied direction or two or more through-holes in different directions. A position at which the cleaning liquid nozzle 30 is to be arranged and the number of nozzles 30 to be arranged may be selected as desired so long as it blows cleaning liquid against a whole front surface 17 of the purification filter section 16 which is a surface of the section 16 defined on an upstream side in a direction of flow of exhaust gas in the exhaust gas pipe 12 and preferably against the whole front surface of the purification filter section 16, as well as a whole surface of the electrification mesh section 14. Nevertheless, it is more preferable that at least one cleaning liquid nozzle 30 is arranged in at least a space defined between the electrification mesh section 14 and the purification filter section 16.

Also, the reactivation unit includes a drain pipe 32 connected to a lower portion of the exhaust gas discharge path or exhaust gas pipe 12. The lower portion of the exhaust gas pipe 12 is formed with an opening 33, through which the drain pipe 32 is permitted to communicate with the space in the exhaust gas pipe 12. In the illustrated embodiment, the drain pipe 32 and opening 33 cooperate with each other to provide a drain means. In order to facilitate recovery of cleaning liquid and useless particulates or fine particles through the drain pipe 32, the lower portion of the exhaust gas pipe 12 is preferably formed in a manner to be downwardly inclined toward the drain pipe 32.

Further, the reactivation unit includes a cleaning liquid tank 34, which is detachably arranged separately from the exhaust gas discharge path or exhaust gas pipe 12. The cleaning liquid tank 34 forms a closed system, of which an interior is vertically divided into two spaces or upper and lower spaces by means of a filter 36 horizontally arranged therein. The filter 36 functions to separate useless particulates recovered together with the cleaning liquid from the cleaning liquid. Thus, it may be formed of a metal wire net having a mesh size sufficient to permit separation between both or a cloth material exhibiting resistance to cleaning liquid. The lower space of the cleaning liquid tank 34 is filled with the cleaning liquid recovered. The cleaning liquid may be selected from the group consisting of water and various kinds of organic solvents. In particular, petroleum solvents such as, for example, industrial gasoline including gasoline, petroleum benzine and petroleum ether, kerosene, and the like are preferably used as the cleaning liquid.

The cleaning liquid nozzle 30 and cleaning liquid tank 34 are connected to each other through a pump 38 by means of a cleaning liquid feed pipe 40. The cleaning liquid feed pipe 40 is so arranged that an end thereof on a side of the cleaning liquid tank 34 downwardly extends through the filter 36 into the lower space of the cleaning liquid tank 34, resulting in being positioned in the cleaning liquid in the lower space of the cleaning liquid tank 36. Also, the drain pipe 32 and cleaning liquid tank 34 are connected through a cleaning liquid recovery pipe 42 to each other. The cleaning liquid recovery pipe 42 is so arranged that an end thereof on a side of the cleaning liquid tank 34 is positioned in the upper space of the cleaning liquid tank 34.

The exhaust gas purifying apparatus of the illustrated embodiment may further include a water vapor condensing means arranged at a suitable portion of the exhaust gas discharge path between the combustion engine and the fine particle adsorbing unit. The water vapor condensing means includes an exhaust gas withdrawing pipe 60 connected at one end thereof to an intermediate portion of a connection exhaust gas pipe 56 connected between the combustion engine and the exhaust gas pipe 12 so as to constitute a part of the exhaust gas discharge path. Also, the water vapor condensing means includes a water reservoir 62 connected to the other end of the exhaust gas withdrawing pipe 60. The exhaust gas withdrawing pipe 60 is mounted thereon with a plurality of fins 64.

Now, the manner of operation of the exhaust gas purifying apparatus of the illustrated embodiment thus constructed will be described hereinafter with reference to FIG. 2.

Figure 7:
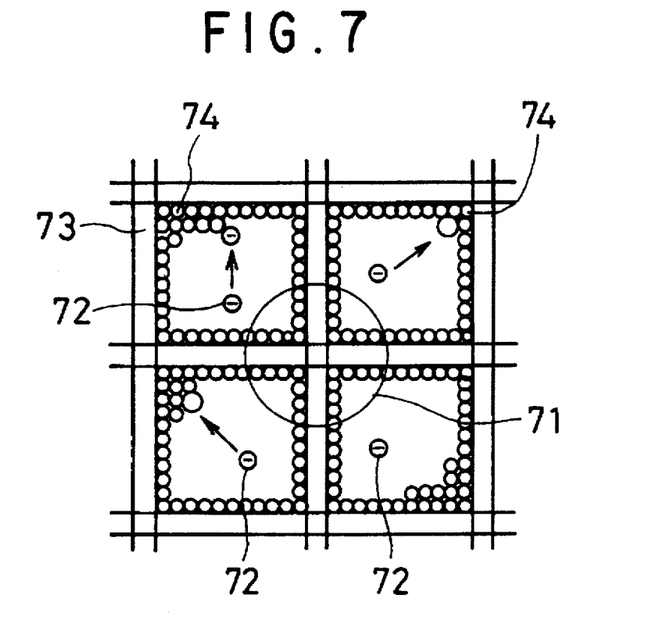
FIG. 7 is a schematic view showing adsorption of fine particles or particulates on a purification filter section.
Figure 8:
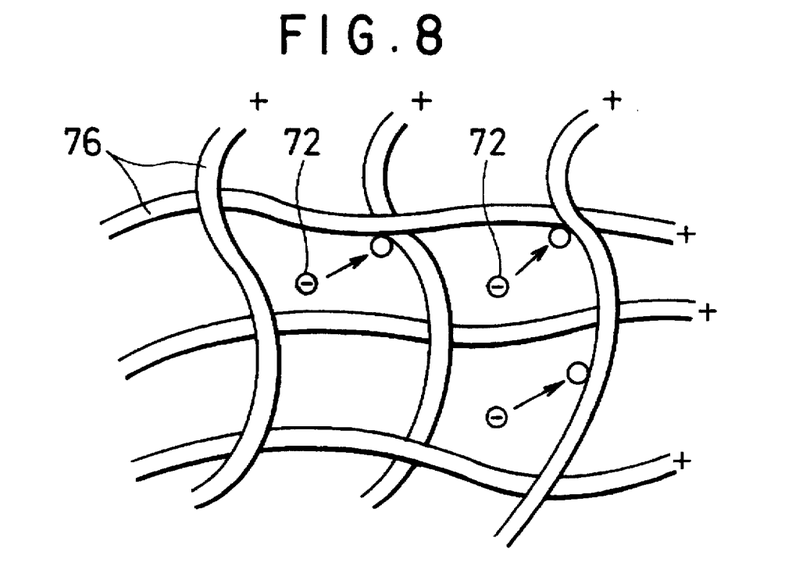
FIG. 8 is a schematic view showing adsorption of particulates on a purification filter section.

First, exhaust gas discharged from the combustion engine is fed to the electrification mesh section 14, wherein fine particles or particulates 70 such as soot and the like kept electrically neutral are electrostatically negatively charged. Then, the exhaust gas is guided to the purification filter section 17, so that the particulates 70 is electrostatically held adsorbed on the filter section 16 by coulombic force. Now, such adsorption will be described with reference to the purification filter section 16 constructed of a composite structure including woven fabrics or non-woven fabrics made of synthetic fiber having a copper powder deposited thereon by electroless plating or electroplating and a carbon fiber felt 76 (FIG. 8) interposed between the fabrics. First, adsorption of relatively large particulates 71 is carried out as shown in FIG. 7 and relatively small particulates 72 are adsorbed on copper powder particles 74. Relatively small particulates passing through the fabric without being captured by adsorption by the copper particles are then adsorbed on a surface of the carbon fiber felt 76 as shown in FIG. 8. The exhaust gas passing though the felt 76 is subject to such an adsorption treatment as shown in FIG. 7 again. This results in the exhaust gas being purified, which is then outwardly discharged through an exhaust port to an ambient atmosphere.

When such an exhaust gas purifying treatment as described above is continuously conducted, useless particulates are adsorbed mainly on the front surface 17 of the purification filter section 16, to thereby gradually block passage of the exhaust gas through the purification filter section 16 with time. This causes a back pressure of the engine or a pressure indicated at a location indicated at P in FIG. 2 to be increased, leading to a problem such as incomplete combustion in the combustion engine or the like. Also, this causes a fine particle adsorbability or exhaust gas purifying capability of the purification filter section 16 to be deteriorated. In order to eliminate such disadvantages, the cleaning liquid stored in the lower space of the cleaning liquid tank 34 is forcibly fed through the cleaning liquid feed pipe 40 to the cleaning liquid nozzle 30 by an action of the pump 38, resulting in the cleaning liquid being ejected from the nozzle 30 into a portion of the space of the exhaust gas pipe 12 defined between the electrification mesh section 14 and the purification filter section 16. This permits the cleaning liquid to be forcibly blown against the whole front surface of the purification filter section 16 to remove the useless particulates from purification filter section 16, so that the particulates may be collected together with the cleaning liquid on an inner lower surface of the exhaust gas pipe 12. The cleaning liquid and useless particulates thus collected are removed from the opening 33 through the drain pipe 32 and then discharged through the cleaning liquid recovery pipe 42 onto the filter 36 of the cleaning liquid tank 34. The useless particulates fail to pass through the filter 36, resulting in being collected on the filter, whereas the cleaning liquid is permitted to pass through the filter 36 and then stored in the lower space of the cleaning liquid tank 34, resulting in being ready to be re-used for cleaning the purification filter section 16. The successive reactivation treatment due to removal of the useless particulates by cleaning liquid is practiced while interrupting operation of the exhaust gas purifying section or turning off the section, therefore, driving of the combustion engine is preferably kept interrupted or idle during the treatment. In the illustrated embodiment, the cleaning liquid tank 34 is arranged in a detachable manner, so that useless particulates collected therein may be suitably discarded therefrom.

Such arrangement of the exhaust gas withdrawing pipe 60 as described above leads to a pre-treatment for removal of the useless particulates. More particularly, a part of exhaust gas at a high temperature introduced into the connection exhaust gas pipe 56 is caused to flow into the exhaust gas withdrawing pipe 60. The exhaust gas flowing into the pipe 60 is cooled by means of the fins 64 while being guided toward the water reservoir 62, so that water vapor contained in the exhaust gas is condensed, resulting in being collected in the form of condensed water in the water reservoir 62. Concurrently, useless particulates contained in water vapor are caused to flow into the water reservoir while being carried on the condensed water, resulting in being collected in the reservoir 62. Thus, the amount of useless particulates to be introduced into the exhaust gas pipe 12 can be reduced. Also, this effectively prevents an increase in back pressure at the position P. Condensed water drops into the water reservoir 62 by gravity, so that exhaust gas purified may be discharged to an ambient atmosphere through openings (not shown) of the reservoir 62.

Figure 9:
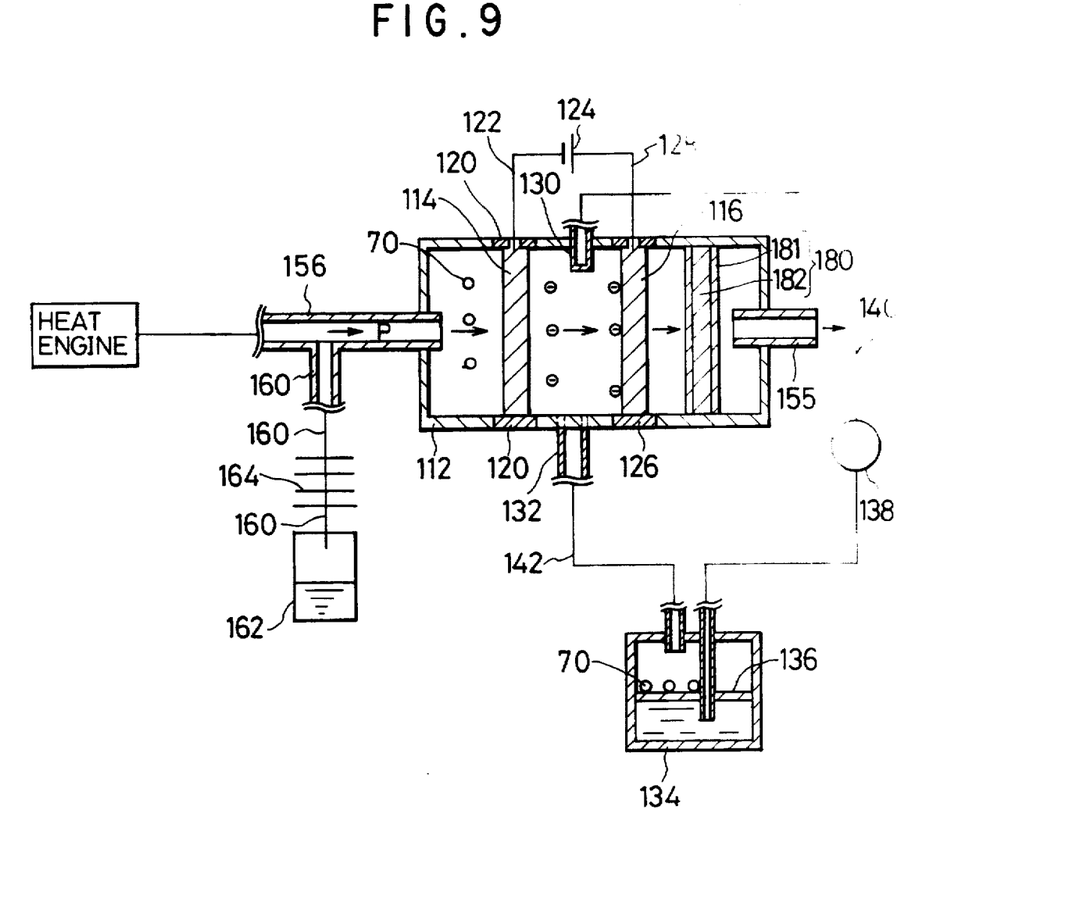
FIG. 9 is a longitudinal sectional view showing another embodiment of an exhaust gas purifying apparatus according to the present invention.

Referring now to FIG. 9, another embodiment of an exhaust gas purifying apparatus according to the present invention is illustrated, which is provided with a denitration filter section including a layer of carbon fiber or a layer of carbon particles. Basically, an exhaust gas purifying apparatus of the illustrated embodiment is constructed in substantially the same manner as the embodiment described above. More particularly, the exhaust gas purifying apparatus includes an electrification mesh section 114 arranged on an upstream side in a direction of flow of exhaust gas in a exhaust gas pipe 112 and a purification filter section 116 arranged on a downstream side therein. Also, the exhaust gas purifying apparatus includes a conductive denitration filter section 180 arranged rearwardly of the purification filter section 116 based on the direction of flow of the exhaust gas. The denitration filter section 180 includes a pair of cover members 181 made of an air-permeable porous conductive material and a carbon fiber or carbon particle layer 182 interposed between the cover members 181. Alternatively, the denitration filter section 180 thus constructed may be arranged between the electrification mesh section 114 and the purification filter section 116 or on an upstream side in the exhaust gas pipe 112 based on the electrification mesh section 114. In FIG. 9, reference numerals 120 and 126 each designate a support, 122 and 128 each are a conductor, 124 is a DC power supply, 155 and 156 each are a connection exhaust gas pipe, 130 is a cleaning liquid nozzle, 134 is a cleaning liquid tank, 136 is a filter, 140 is a clearing liquid feed pipe, and 142 is a cleaning liquid recovery pipe, which may be constructed in substantially the same manner as the corresponding parts of the embodiment of FIG. 2.

The porous conductive material for the cover members 181 may be selected from the group consisting of a metal wire net, punched metal and the like. The metal wire net and punched metal may be formed into a mesh size of about 40 to 500 so as to permit carbon fiber or carbon particles to be carried thereon.

The carbon fiber layer or carbon particle layer 182 may be made of any conventional carbon fiber or carbon particles. Such carbon fiber or carbon particles formed into a denatured structure by activation as described above in connection with the embodiment of FIG. 2 may be suitably used for this purpose. The carbon fiber preferably has a diameter of 0.5 to 15 µm. The carbon fiber may be applied without any treatment or as it is left alone. Alternatively, it may be applied in the form of a felt, a mat or a cloth which is woven. The carbon particles are preferably in the form of a sphere-like shape having a diameter of 0.01 to 2 mm.

Now, the manner of operation of the exhaust gas purifying apparatus thus constructed will be described hereinafter with reference to FIG. 9. Particulates such as soot and the like contained in exhaust gas discharged from an internal combustion engine and introduced into the exhaust gas purifying apparatus are electrostatically negatively charged at the electrification mesh section 114 and then adsorbed on the purification filter section 116. The exhaust gas from which the particulates are removed is then contacted with the carbon fiber or carbon particle layer 182 of the denitration filter section 180 while still containing nitrogen oxides mainly consisting of NOx, wherein the nitrogen oxides are reacted with carbon atoms to form an intermediate product (C—O), which is adsorbed on the carbon fiber or particle layer 182. N is converted into $N_2$ and the intermediate product adsorbed is converted into $CO_2$ and a slight amount of CO. Thus, the exhaust gas passing through the denitration filter section 180 is substantially free of any particulates and contains $N_2$, $CO_2$ and CO in place of nitrogen oxides. In the exhaust gas purifying apparatus shown in FIGS. 2 to 6, when the purification filter section is likewise formed of carbon fiber or carbon particles, it functions as a denitration filter section as well, to thereby accomplish removal of particulates, as well as denitration and muffling.

The exhaust gas purifying apparatus of the illustrated embodiment carries out reactivation as in the embodiment of FIG. 2 described above. More particularly, useless particulates adsorbed on the purification filter section 116 are removed therefrom by means of cleaning liquid ejected from the cleaning liquid nozzle 130, recovered through the drain pipe 132, and then collected in the cleaning liquid tank 134. Further, an exhaust gas withdrawing pipe 160 connected to the connection exhaust gas pipe 156, fins 164 and water reservoir 162 cooperate together to carry out a pre-treatment of reducing a content of useless particulates in the exhaust gas.

Figure 1:
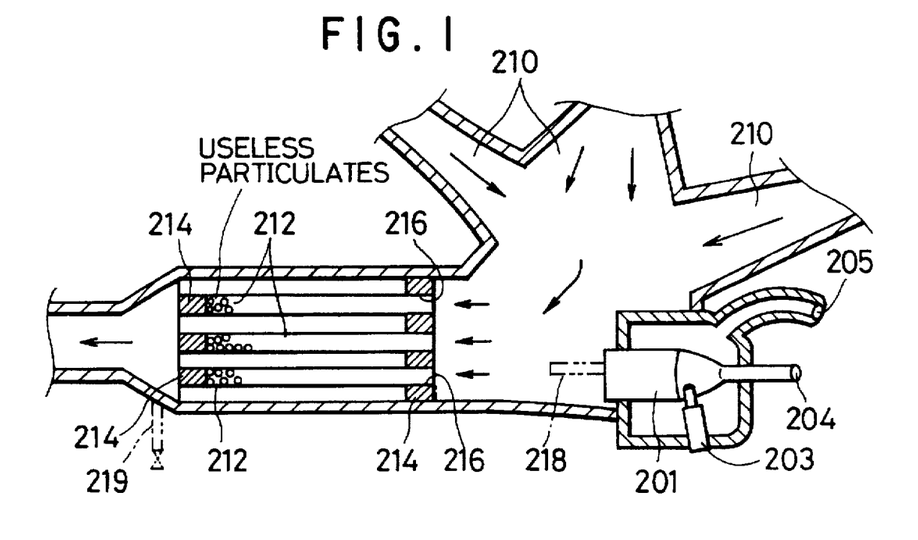
FIG. 1 is a longitudinal sectional view showing a fine particle removing unit having ceramic filters incorporated therein.

The reactivation unit of the exhaust gas purifying apparatus of the present invention can be applied to not only the exhaust gas purifying apparatus including the fine particle adsorbing unit of the specific structure shown in FIG. 2 but an exhaust gas purifying apparatus of a general structure such as, for example, a ceramic filter shown in FIG. 1. Now, the reactivation unit will be described with reference to FIG. 1 showing a fine particle removing unit having ceramic filters incorporated therein.

In the fine particle removing unit shown in FIG. 1, a combustion chamber 201, an ignition plug 203, a fuel feed pipe 204 and an air intake member 205 are removed and a cleaning liquid tank (not shown) is substituted therefor in a manner to be detachable. The cleaning liquid tank has an interior divided into two spaces. One of the spaces is filled with cleaning liquid. Into the space filled with the cleaning liquid is inserted one end of a cleaning liquid feed pipe (not shown), which is mounted at the other end thereof with a cleaning liquid nozzle 218 indicated at phantom lines in FIG. 1. The cleaning liquid nozzle 218 is positioned so as to permit cleaning liquid to be ejected into a space of an exhaust gas purification chamber in which a plurality of ceramic filters 212 to be cleaned are arranged or a space defined by a cooperation between the ceramic filters 212 and barriers 214, to thereby remove useless particulates accumulated on the filters 212 therefrom. The useless particulates removed are outwardly discharged through a drain pipe 219 indicated at phantom lines. The drain pipe 219 is arranged in proximity to an entrance as compared with the cleaning liquid nozzle 218 in the same space. In FIG. 1, the entrance is a port 216 through which exhaust gas is guided toward the ceramic filters 212. The drain pipe 219 is connected to the cleaning liquid tank through a cleaning liquid recovery pipe (not shown), of which an end is positioned in the other space of the cleaning liquid tank which is not filled with cleaning liquid. The cleaning liquid feed pipe described above is connected to a pump, so that cleaning liquid may be forcibly fed through the cleaning liquid feed pipe. The cleaning liquid recovery pipe may be likewise connected to the pump as required, so that cleaning liquid ejected may be forcedly recovered. In FIG. 1, reference numeral 210 designates an exhaust manifold and an arrow in FIG. 1 indicates a direction of flow of exhaust gas.

Now, the manner of operation of the fine particle removing unit thus constructed will be described hereinafter. The pump is actuated, so that cleaning liquid is forcibly fed from the cleaning liquid tank through the cleaning liquid feed pipe and then ejected from the cleaning liquid nozzle 218 toward the ceramic filters 212, resulting in useless particulates adhered to the ceramic filters 212 being removed therefrom. Then, the useless particulates are recovered together with the cleaning liquid through the drain pipe 219 and then collected through the cleaning liquid recovery pipe in the cleaning liquid tank.

The present invention will be understood more readily with reference to the following test examples; however, the test examples are intended to illustrate the invention and are not to be construed to limit the scope of the invention.

Test Example 1

An exhaust gas purifying capability and a reactivation capability were tested using an exhaust gas purifying apparatus constructed in such a manner as shown in FIG. 2. Test conditions and a test procedure were as indicated below. For comparison, a procedure of externally applying vibration to the same fine particle adsorbing unit by means of compressed air was employed for reactivation of the exhaust gas purifying apparatus.

Figure 10:
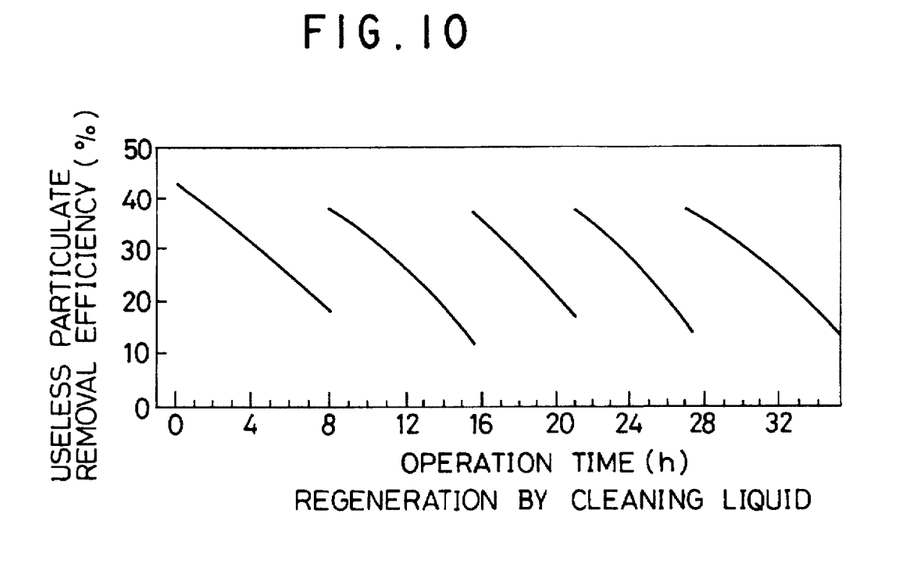
FIG. 10 is a graphical representation showing relationship between a fine particle adsorbability of an exhaust gas purifying apparatus and reactivation thereof.
Figure 11:
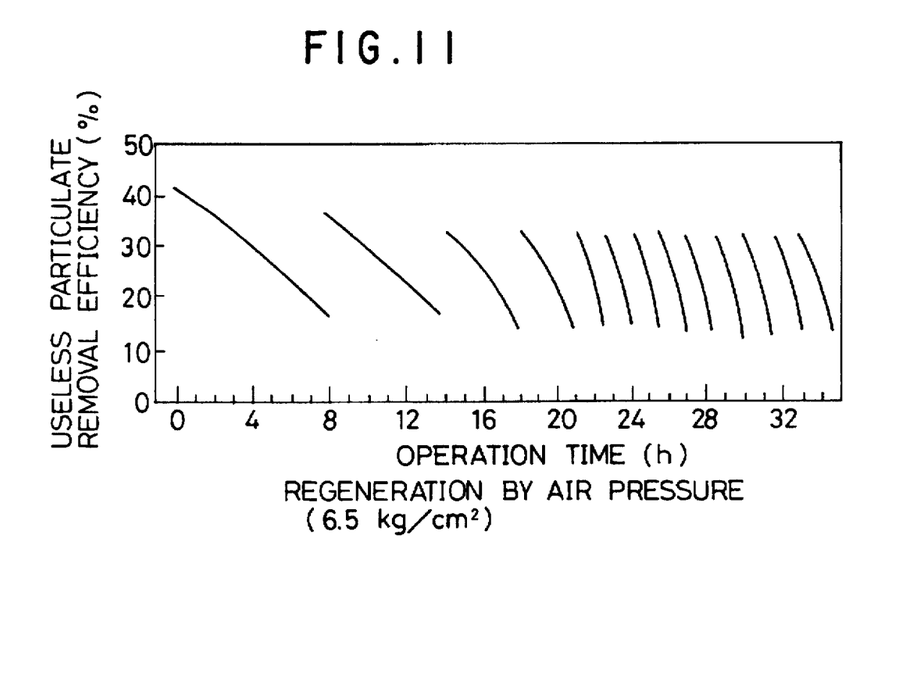
FIG. 11 is a graphical representation showing relationship between a fine particle adsorbability of an exhaust gas purifying apparatus and reactivation thereof.

The number of fine particles or particulates was measured using a Bosch smoke densitometer according to JIS D8004. A removal rate of particulates was indicated at a percentage of a value obtained by dividing a difference between the initial number of particulates and the number of particulates after the treatment by the initial number of particulates. Results were as shown in FIGS. 10 and 11.

Test Conditions (Construction of fine particulate adsorbing apparatus)

Electrification filter

Purification filter

Voltage applied

Engine used: 1.7 kW (3000 rpm) diesel engine generator

Flow rate of exhaust gas : 0.24 m³/min (Construction of reactivation unit)

Volume of cleaning liquid tank: 5 liters

Type of filter in cleaning liquid tank: woven fabric of about 500 meshes

Type of cleaning liquid: gasoline

Diameter of cleaning liquid feed pipe and cleaning liquid recovery pipe: 8 mm

Pump pressure (cleaning liquid feed pressure): 2.5 kg/cm² and 0.2 kW (DC 24V)

The number of cleaning liquid nozzles: 1

Test Procedure

Actuation of a diesel engine generator was stopped and a power supply was turned off, after about 8 hours elapsed from stating of the exhaust gas and when a pressure at an entrance of the fine particle adsorbing unit reached a level of 650 mmH$_2$O. Then, cleaning liquid was blown against a whole area of a front surface of a purification filter section which is a surface (17 in FIG. 2) of the section defined on an upstream side in a direction of flow of exhaust gas for 30 seconds, to thereby recover useless particulates together with the cleaning liquid, followed by re-starting of the generator. Then, the generator was driven for about 6 to 8 hours, followed by repeating of regeneration. Such a procedure was repeated to drive the generator for about 72 hours in total.

Regeneration for comparison was conducted in such a manner as indicated hereinafter. After about eight hours elapsed from starting of the exhaust gas purifying apparatus to cause a pressure at the entrance of the fine particle adsorbing unit to be at a level of 650 mmH$_2$O, driving of the diesel engine generator was interrupted and the power supply was turned off. Then, air was externally blown against four locations on the fine particle adsorbing apparatus at a pressure of 2.5 kg/cm² for 30 minutes for every location to vibrate the whole apparatus, to thereby remove useless particulates from the purification filter.

As will be noted from FIG. 10, the exhaust gas purifying apparatus of the present invention including the regeneration unit utilizing the cleaning liquid exhibited a fine particle removal degree as high as about 40 to 20% over a total operation period as long as 72 hours during which a cycle consisting of driving for about 6 to 8 hours and regeneration was repeated. This indicates that the exhaust gas purifying apparatus of the present invention exhibits a stable exhaust gas purifying performance.

On the contrary, the comparison test in which regeneration by vibration using an air pressure was conducted, as shown in FIG. 11, was deteriorated in fine particle removal degree in a short period of time and decreased in restoration by regeneration. Also, in the comparison test, a continuous operation enable period was rapidly reduced around a third cycle at which a total operation period exceeded about 14 hours and regeneration was frequently required after then. Then, operation was substantially impossible.

Test Example 2

In Test Example 2, a reduction efficiency and a degree of decrease of unburnt hydrocarbon (HC) were measured using such an exhaust gas purifying apparatus including a denitration filter section as shown in FIG. 9. An exhaust gas purification section and a useless fine particle removing section were constructed in substantially the same manner as in Test Example 1 described above, except that an exhaust gas withdrawing pipe is not provided. An electrification filter and a purification filter each had palladium or platinum deposited in a total amount of 76 g on both sides thereof by plating. A denitration filter section was constructed of 65 g carbon fiber wrapped with a stainless steel wire net. Results of the test were as shown in Table 1. In Table 1, the degree of denitration and the degree of decrease of unburnt hydrocarbon (HC) each are indicated at a percentage of a value obtained by dividing a difference between an initial concentration of NO$_x$ or HC (a concentration of NO$_x$ or HC near an outlet of a diesel engine generator) and a concentration thereof after the treatment (a concentration of NO$_x$ or HC in the connection exhaust pipe 155 in FIG. 9) by the initial NO$_x$ or HC concentration.

TABLE 1

|  | Pd plating | Pt plating |
| --- | --- | --- |
| Denitration (%) | 4.6 | 4.5 |
| Decrease in HC (%) | 12.8 | 26.0 |

Also, an exhaust gas purifying capability and a reactivation capability were tested using an exhaust gas purifying apparatus constructed in such a manner as shown in FIG. 9. Results similar to those obtained by the exhaust gas purifying apparatus constructed as shown in FIG. 2 were obtained.

Test Example 3

In Test Example 3, a reduction efficiency (%) was measured using such an exhaust gas purifying apparatus constructed in the same manner as that used in Test Example 2. A reduction efficiency (%) was indicated at a percentage of a value obtained by dividing a difference between a NOx concentration at an inlet of the apparatus and a NOx concentration at an outlet of the apparatus by the NOx concentration at the inlet of the apparatus. A denitration filter was made of a fiber product of epoxy resin cured and carbonized in an amount of 6 g or a pitch carbon fiber felt in an amount of 6 g. Also, in the test, exhaust gas having a NOx concentration of 2500 ppm was discharged. Results were as shown in Table 2.

TABLE 2

|  | 300° C. | 350° C. | 400° C. |
|---|---|---|---|
| Epoxy resin product | 4.9 | 7.8 | 8.6 |
| Pitch carbon fiber | 2.8 | 2.8 | 2.9 |

As can be seen from the foregoing, in the exhaust gas purifying apparatus of the present invention, the electrification mesh section electrostatically negatively charges useless particulates such as soot and the like contained in exhaust gas and the purification filter section adsorbs thereon the particulates thus charged, resulting in the particulates being separated from the exhaust gas. Also, when the purification filter is made of carbon fiber or carbon particles or the denitration filter section is additionally provided, the present invention accomplishes a reduction in concentration of nitrogen oxides in exhaust gas as well as removal of particulates.

Also, in the present invention, the reactivation unit is so constructed that cleaning liquid cleans the purification filter section or removes useless particulates from the filter section, section, so that an exhaust gas purification capacity of the exhaust gas purifying apparatus may be restored to a level substantially equal to an initial level thereof.

The exhaust gas purifying apparatus of the present invention is suitably applicable to various kinds of heat combustion engines such as, for example, an automobile, a construction machine, a generator engine, a diesel engine for a ship, and the like. Also, the exhaust gas purifying apparatus of the present invention may be suitably incorporated in an exhaust gas re-circulating path of a heat combustion engine.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An exhaust gas purifying apparatus comprising:

a fine particle adsorbing unit for removing, by adsorption, useless particulates contained in exhaust gas produced by combustion of fuel in a combustion chamber of a heat combustion engine from the exhaust gas to purify the exhaust gas;

a reactivation unit for removing the adsorbed useless particulates from said fine particle adsorbing unit by cleaning, to thereby restore an exhaust gas purifying capability of said fine particle adsorbing unit;

said fine particle adsorbing unit including at least one combination of an electrification mesh section and a purification filter section;

said electrification mesh section being arranged in an exhaust gas discharge path extending from the heat combustion engine and including a conductive porous material connected to a negative electrode of a DC power supply;

said purification filter section being arranged on a downstream side in said exhaust gas discharge path based on said electrification mesh section and including a conductive material layer connected to a positive electrode of the DC power supply;

said reactivation unit including a cleaning liquid nozzle for receiving and discharging a cleaning liquid into a space defined in said exhaust gas discharge path in which said fine particle adsorbing unit is arranged, a drain means arranged at a lower portion of said exhaust gas discharge path for draining the cleaning liquid from the space defined in said exhaust gas discharge path in which said fine particle adsorbing unit is arranged, and a cleaning liquid tank detachably arranged separately from said exhaust gas discharge path for holding the cleaning liquid;

a cleaning liquid feed pipe for connecting said cleaning liquid nozzle and said cleaning liquid tank to each other therethrough;

a cleaning liquid recovery pipe for connecting said drain means and said cleaning liquid tank to each other therethrough, and water vapor condensing means for condensing water contained in the exhaust gas, said water vapor condensing means including an exhaust gas withdrawing pipe equipped with fins and arranged at a portion of said exhaust gas discharge path between the combustion engine and said fine particle adsorbing unit and a water reservoir connected to said exhaust gas withdrawing pipe.

2. An exhaust gas purifying apparatus as defined in claim 1, wherein said DC power supply generates a voltage of 12 to 500 volts and a current of less than 0.1 ampere.

3. An exhaust gas purifying apparatus as defined in claim 1, wherein said conductive porous material for said electrification mesh section is constructed of a substrate and a conductive substance carried on said substrate;

said substrate being selected from a group consisting of a carbon fiber felt, a carbon fiber cloth, a stainless steel wire net, a stainless steel wire felt, a fabric of synthetic fiber and a non-woven fabric of synthetic fiber;

said conductive substance being a metal powder deposited on said substrate by plating.

4. An exhaust gas purifying apparatus as defined in claim 3, wherein said conductive substance carried on said substrate of said electrification mesh section is selected from a group consisting of platinum and palladium and is deposited on said substrate by plating.

5. An exhaust gas purifying apparatus as defined in claim 3, wherein said substrate is carbon fiber felt or carbon fiber cloth including carbon fiber, said carbon fiber in said carbon fiber cloth or carbon fiber felt having an average surface area of 0.5 to 2000 $m^2/g$.

6. An exhaust gas purifying apparatus as defined in claim 1, wherein said conductive porous material for said electrification mesh section has a mesh size of 20 to 500.

7. An exhaust gas purifying apparatus as defined in claim 1, wherein said conductive material layer for said purification filter section is at least one selected from a group consisting of a carbon fiber felt, a carbon fiber cloth, a stainless steel wire net, a stainless steel wire felt, a woven fabric of synthetic fiber and a non-woven fabric of synthetic fiber which have a metal powder deposited thereon by plating, and a laminate plate of porous epoxy resin cured and carbonized and a fiber product thereof.

8. An exhaust gas purifying apparatus as defined in claim 1, wherein said conductive material layer for said purification filter section has one of platinum and palladium deposited thereon by plating.

9. An exhaust gas purifying apparatus as defined in claim 1, wherein said cleaning liquid is a petroleum solvent.

10. An exhaust gas purifying apparatus as defined in claim 1, further comprising a denitration filter section including a layer containing one of carbon fiber and carbon particles and arranged at any desired portion of said exhaust gas discharge path.

* * * * *